US006307376B1

(12) United States Patent
Alexander et al.

(10) Patent No.: US 6,307,376 B1
(45) Date of Patent: Oct. 23, 2001

(54) FAULT DETECTION SYSTEM AND METHOD FOR SOLENOID CONTROLLED ACTUATORS OF A TRANSMISSION SYSTEM

(75) Inventors: Randy Alexander, Elkhart, IN (US); David L. Wadas; Yei Dei Wang, both of Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/219,029

(22) Filed: Dec. 23, 1998

(51) Int. Cl.[7] ........................................... H03K 3/01
(52) U.S. Cl. .......................... 324/388; 324/546; 361/154
(58) Field of Search ................................. 324/546, 537, 324/522, 388, 415; 192/30 W; 340/643, 648, 650, 664, 660; 361/154

(56) References Cited

U.S. PATENT DOCUMENTS

| | | | |
|---|---|---|---|
| 3,761,806 | * 9/1973 | Napor et al. | 324/658 |
| 4,595,986 | 6/1986 | Daubenspeck et al. | 342/373 |
| 4,702,127 | 10/1987 | Cote | 477/75 |
| 4,849,899 | 7/1989 | Cote et al. | 701/63 |
| 4,888,577 | 12/1989 | Dunkley et al. | 340/461 |
| 4,922,425 | 5/1990 | Mack et al. | 701/63 |
| 4,949,215 | * 8/1990 | Studtmann et al. | 361/154 |
| 5,204,802 | * 4/1993 | Howes et al. | 361/154 |
| 5,243,296 | * 9/1993 | Ando et al. | 324/546 |
| 5,272,441 | 12/1993 | Wright et al. | 324/546 |
| 5,345,181 | * 9/1994 | Mantani et al. | 324/546 |
| 5,347,419 | * 9/1994 | Caron et al. | 361/154 |
| 5,375,056 | 12/1994 | Nitschke et al. | 364/424.03 |
| 5,477,675 | * 12/1995 | Ingraham et al. | 60/418 |
| 5,754,963 | 5/1998 | Nunneley et al. | 701/34 |
| 5,773,981 | * 6/1998 | Sugiura et al. | 324/546 |
| 5,784,245 | * 7/1998 | Moraghan et al. | 361/154 |
| 5,789,933 | 8/1998 | Brown et al. | 324/765 |
| 5,815,362 | * 9/1998 | Kahr et al. | 361/153 |

* cited by examiner

*Primary Examiner*—Safet Metjahic
*Assistant Examiner*—Vincent Q. Nguyen
(74) *Attorney, Agent, or Firm*—Charles E. Kosinski; Howard D. Gordon (57) ABSTRACT

An improved system and method for detecting solenoid-related faults in a solenoid-controlled actuator assembly. The system includes a processing circuit which controls a solenoid driver circuit for energizing and de-energizing the solenoid, a current sense circuit for sensing the current in the solenoid, and a power supply switching circuit for selectively connecting and disconnecting a supply voltage from the solenoid driver circuit. The processing circuit implements fault detection logic wherein the processing circuit senses the current in the solenoid and, if the sensed current exceeds a predetermined current value for a predetermined time period, disconnects the supply voltage from the solenoid driver circuit and measures the rate of voltage decay in the solenoid driver circuit to determine if an open circuit fault or a short circuit fault exists.

18 Claims, 9 Drawing Sheets

FAULT DETECTION SYSTEM AND METHOD FOR SOLENOID CONTROLLED ACTUATORS OF A TRANSMISSION SYSTEM

BACKGROUND OF THE INVENTION

1. Field of the Invention

The present invention relates to a control system and/or method for sensing faulty solenoids. In particular, the present invention relates to a control system and/or method for sensing faults in the solenoids of solenoid-controlled actuators for vehicular automated or semi-automated change gear transmission systems.

2. Description of the Prior Art

Change-gear mechanical transmissions are well known in the prior art, as may be seen by reference to U.S. Pat. Nos. 3,105,395; 3,335,616; 4,428,469; 4,754,665; 4,920,815; 4,944,197; 5,086,897; 5,370,013; and 5,390,561, the disclosures of which are incorporated herein by reference. Two-position and three-position, fluid-actuated, actuator piston assemblies and actuator systems associated therewith also are well known in the prior art, as may be seen by reference to U.S. Pat. Nos. 4,899,607; 4,928,544; 4,936,156; 5,054,591; 5,193,410; 5,263,379; 5,272,441; 5,329,826; 5,651,292; and 5,661,998, the disclosures of which are incorporated herein by reference.

Transmission systems of particular reference are disclosed in the following patent applications, the disclosures of which are incorporated herein by reference:

Ser. No. 09/178,346 filed Oct. 22, 1998 entitled "ROBUST CONTROL FOR THREE-POSITION TRANSMISSION SHIFT ACTUATOR ASSEMBLY"

Ser. No. 08/053,089 filed Apr. 1, 1998 entitled "RANGE SHIFT CONTROL"

Ser. No. 08/053,090 filed Apr. 1, 1998 entitled "ADAPTIVE NEUTRAL SENSING"

Ser. No. 08/053,091 filed Apr. 1, 1998 entitled "JAW CLUTCH ENGAGEMENT CONTROL FOR ASSISTED, MANUALLY SHIFTED, SPLITTER-TYPE TRANSMISSION SYSTEM"

Ser. No. 08/053,092 filed Apr. 1, 1998 entitled "ENGINE FUEL CONTROL FOR COMPLETING SHIFTS IN CONTROLLER-ASSISTED, MANUALLY SHIFTED TRANSMISSIONS"

Ser. No. 08/053,093 filed Apr. 1, 1998 entitled "ADAPTIVE UPSHIFT JAW CLUTCH ENGAGEMENT CONTROL"

Ser. No. 08/053,095 filed Apr. 1, 1998 entitled "DYNAMIC RANGE SHIFT ACTUATION"

Ser. No. 08/053,181 filed Apr. 1, 1998 entitled "ADAPTIVE SPLITTER ACTUATOR ENGAGEMENT FORCE CONTROL"

Ser. No. 08/902,603 filed Aug. 7, 1997 entitled "PARTIALLY AUTOMATED, LEVER-SHIFTED MECHANICAL TRANSMISSION SYSTEM"

Ser. No. 08/990,678 filed Dec. 15, 1997 entitled "ASSISTED LEVER-SHIFTED TRANSMISSION"

Controls for automated and semi-automated transmission systems, including fault detection systems and/or methods, are known in the prior art as may be seen by reference to U.S. Pat. Nos. 4,595,986; 4,702,127; 4,922,425; 4,888,577; 4,849,899; and 5,272,441, the disclosures of which are hereby incorporated by reference.

It is known that solenoid-related faults sometimes occur in the solenoid-controlled actuators used in vehicular transmission systems. If such a fault occurs, it is highly desirable to indicate such a condition to the operator of the vehicle, and to initiate some safe form of recovery logic and/or temporary mode of operation. These actions will notify the operator that correction action is required, and will minimize the possibility of the transmission suffering mechanical damage or behaving in an unintended manner.

In order to properly respond to a solenoid-related fault, a reliable fault detection system must be implemented. Although examples of fault detection systems can be found in the prior art, such systems typically are complicated, cannot detect a wide variety of solenoid-related faults, or cannot reliably be implemented in all transmission control configurations. One particular problem with the prior art fault detection systems is their inability to be reliably implemented in low side solenoid driver circuit configurations, such configurations being desirable in that they enable a less complicated and lower cost electronic control unit to be used in the transmission control.

SUMMARY OF THE INVENTION

The present invention provides an improved fault detection system and method which minimizes or overcomes the problems of the prior art.

The fault detection system of the present invention includes a solenoid driver circuit for energizing and de-energizing the solenoid, a current sense circuit for sensing the current in the solenoid, and a power supply switching circuit for selectively connecting and disconnecting a supply voltage from the solenoid driver circuit. Also included is a processing circuit that is connected to and controls the solenoid driver circuit, the current sense circuit, and the power supply switching circuit. The processing circuit implements fault detection logic wherein the processing circuit senses the current in the solenoid and, if the sensed current exceeds a predetermined current value for a predetermined time period, disconnects the supply voltage from the solenoid driver circuit and measures the rate of voltage decay in the solenoid driver circuit to determine if an open circuit fault or a short circuit fault exists.

Other objects and advantages of the present invention will become apparent from a reading of the following description of the preferred embodiment taken in connection with the attached drawings.

DESCRIPTION OF THE PREFERRED EMBODIMENT

Figure 2:
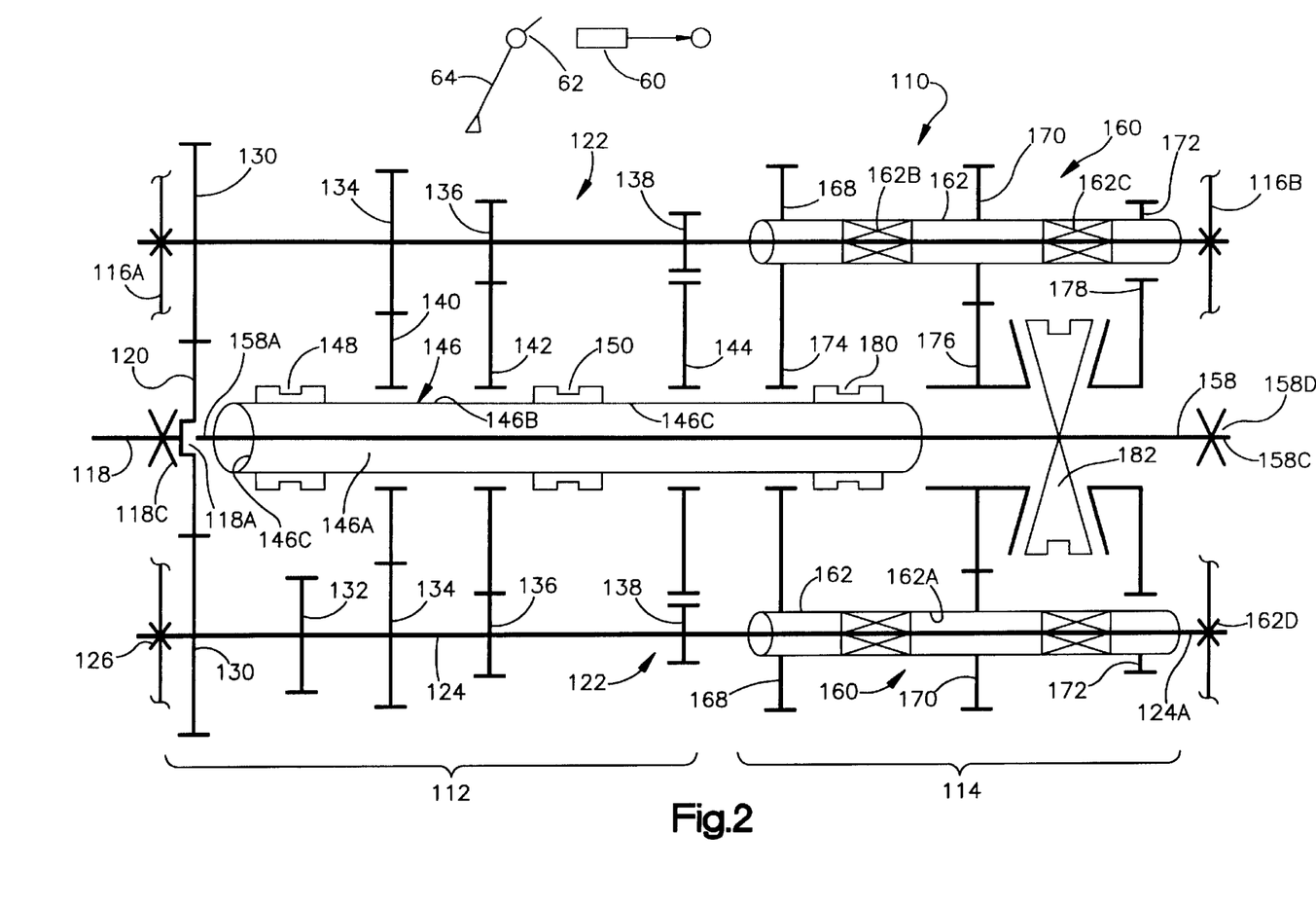
FIG. 2 is a schematic illustration of a compound transmission advantageously utilizing the actuator system of FIG. 1.

Certain terminology is used in the following description for convenience only and is not limiting. The words "upwardly," "downwardly," "rightwardly" and "leftwardly" will designate directions in the drawings to which reference is made. The words "forward" and "rearward" will refer respectively to the front and rear ends of the transmission as conventionally mounted in the vehicle, being respectively to the left and right sides of the transmission as illustrated in FIG. 2. The words "inwardly" and "outwardly" will refer respectively to directions toward and away from the geometric center of the device and designated parts thereof. Said terminology includes the words above specifically mentioned, derivatives thereof and words of similar import.

The term "compound transmission" is used to designate a change-speed or change-gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio, and the term "downshift" as used herein shall mean the shifting from a higher speed gear ratio to a lower speed gear ratio. The terms "low speed gear" or "low gear" as used herein shall designate a gear utilized for relatively low forward speed operation in a transmission (i.e., a set of gears having a higher ratio of reduction of output shaft speed relative to the speed of the input shaft). "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation and relatively large capacity friction means are associated with the clutch members and are sufficient, upon initiation of a clutch engagement, to cause the clutch members and all members rotating therewith to rotate at a substantially synchronous speed.

Figure 3:
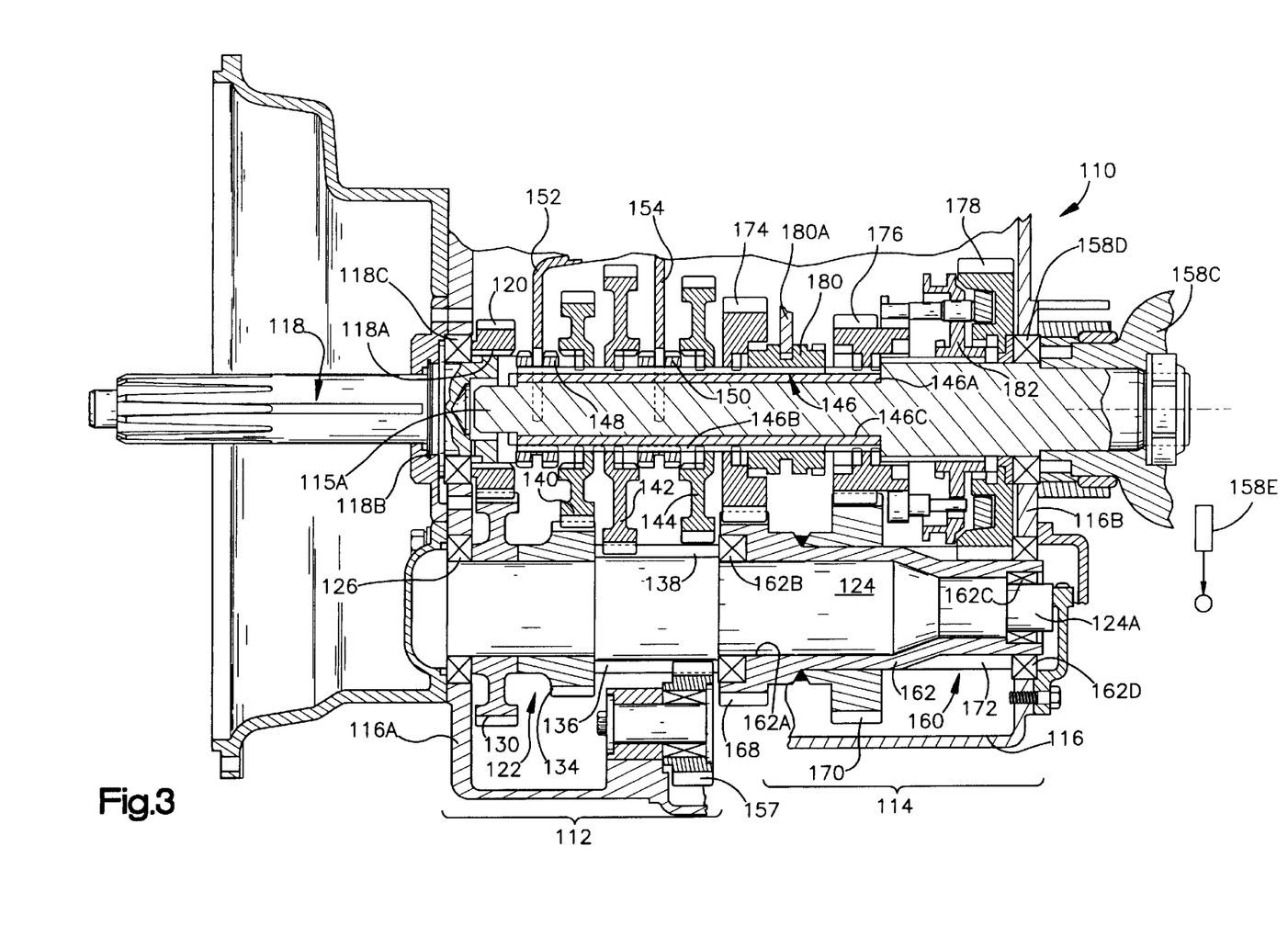
FIG. 3 is a sectional view of a preferred embodiment of the transmission of FIG. 2.
Figure 4:
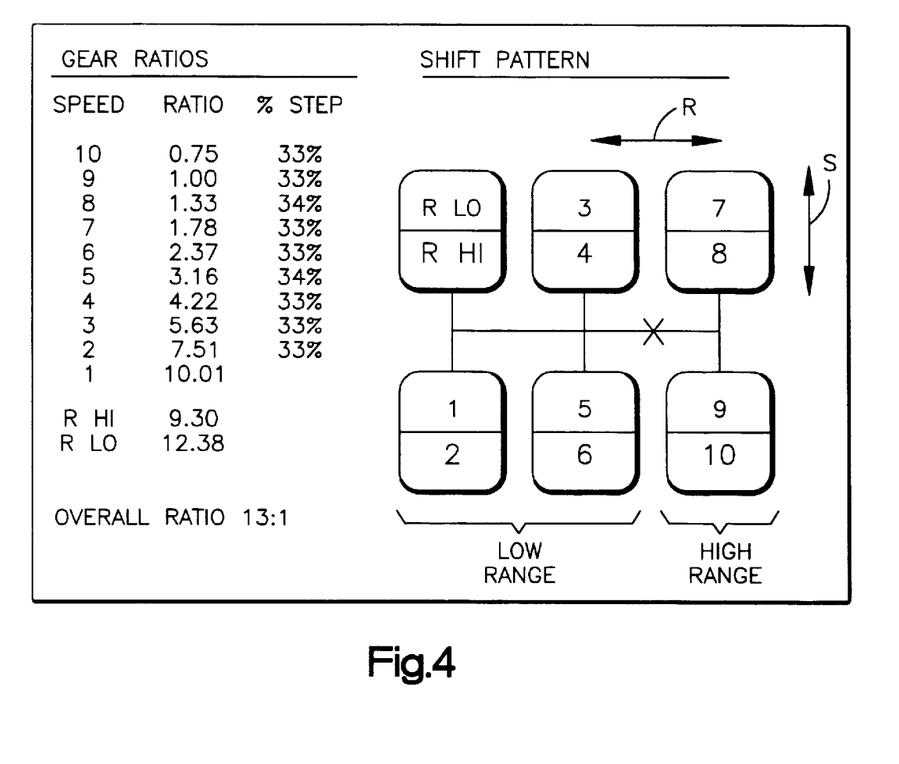
FIG. 4 illustrates a typical shift pattern and typical gear ratios for the transmission of FIG. 2.

The fluid-actuated, three-position shift actuator system 10 of the present invention, and the three-position actuator piston assembly 12 utilized therein, may be especially advantageously utilized as a splitter clutch actuator in a compound transmission 110, as illustrated in FIGS. 2–4.

Transmission 110 includes a mainsection 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shaft 118 is supported by bearing 118C in front end wall 116A while the rearward end 158C of output shaft 158 is supported by bearing assembly 158D in rear and wall 116B. Bearing assembly 158D may be a pair of opposed taper bearings or a single roller or ball bearing as is illustrated in FIG. 3.

The mainshaft 146, which carries mainshaft clutches 148 and 150, and the mainshaft splitter clutch 180 is in the form of a generally tubular body 146A having an externally splined outer surface 146B and an axially extending through bore 146C for passage of output shaft 158. Shift forks 152 and 154 are provided for shifting clutches 148 and 150, respectively. Mainshaft 146 is independently rotatable relative to input shaft 118 and output shaft 158 and, preferably, is free for limited radial movements relative thereto.

The mainsection 112 includes two substantially identical mainsection countershaft assemblies 122, each comprising a mainsection counter-shaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively.

Mainsection countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto, while synchronized range clutch 182 is fixed to output shaft 158 for selectively clutching either gear 176 or gear 178 thereto. Preferably, the splitter clutch is axially positioned by a shift fork 180A controlled by the actuator system 10 of the present invention.

Auxiliary countershafts 162 are generally tubular in shape defining a through bore 162A for receipt of the rearward extensions of the mainsection countershafts 124. Bearings or bushings 162B and 162C are provided to rotatably support auxiliary countershaft 162 on mainsection countershaft 124. Bearing 162D directly or indirectly supports the rear ends of countershafts 124 and 162 in the rear end wall 116B.

The structure and function of double-acting jaw clutch collar 180 is substantially identical to the structure and function of the sliding clutch collars 148 and 150 utilized in the main transmission section 112 and the function of double-acting synchronized clutch assembly 182 is substantially identical to the structure and function of prior art double-acting synchronized clutch assemblies, examples of which may be seen by reference to U.S. Pat. Nos. 4,462,489; 4,125,179 and 2,667,955, the disclosures of which are incorporated herein by reference. The synchronized clutch assembly 182 illustrated is of the pin type described in aforementioned U.S. Pat. No. 4,462,489.

When used in connection with the actuator system 10 of the present invention, the splitter jaw clutch 180 is a three-position clutch assembly which may be selectively positioned in the rightwardmost (direct) or leftwardmost (overdrive) positions for engaging either gear 176 or gear 174, respectively, to the mainshaft 146 or in an intermediate non-engaged (neutral) position. The neutral position refers to the range of intermediate positions of clutch 180 wherein neither gear 174 nor 176 is engaged to the mainshaft 146.

As may be seen by reference to FIGS. 2–4, by selectively axially positioning both the splitter clutch 180 and the range clutch 182 in the forward and rearward axial positions thereof, four distinct ratios of mainshaft rotation to output shaft rotation may be provided. Accordingly, auxiliary transmission section 114 is a three-layer auxiliary section of the combined range and splitter type providing four selectable speeds or drive ratios between the input (mainshaft 146) and output (output shaft 158) thereof. The mainsection 112 provides a reverse and three potentially selectable forward speeds. However, one of the selectable mainsection forward gear ratios, the low speed gear ratios associated with mainshaft gear 142, is not utilized in the high range. Thus, transmission 110 is properly designated as a "(2+1)×(2×2)" type transmission providing nine or ten selectable forward speeds, depending upon the desirability and practicality of splitting the low gear ratio.

Figure 6:
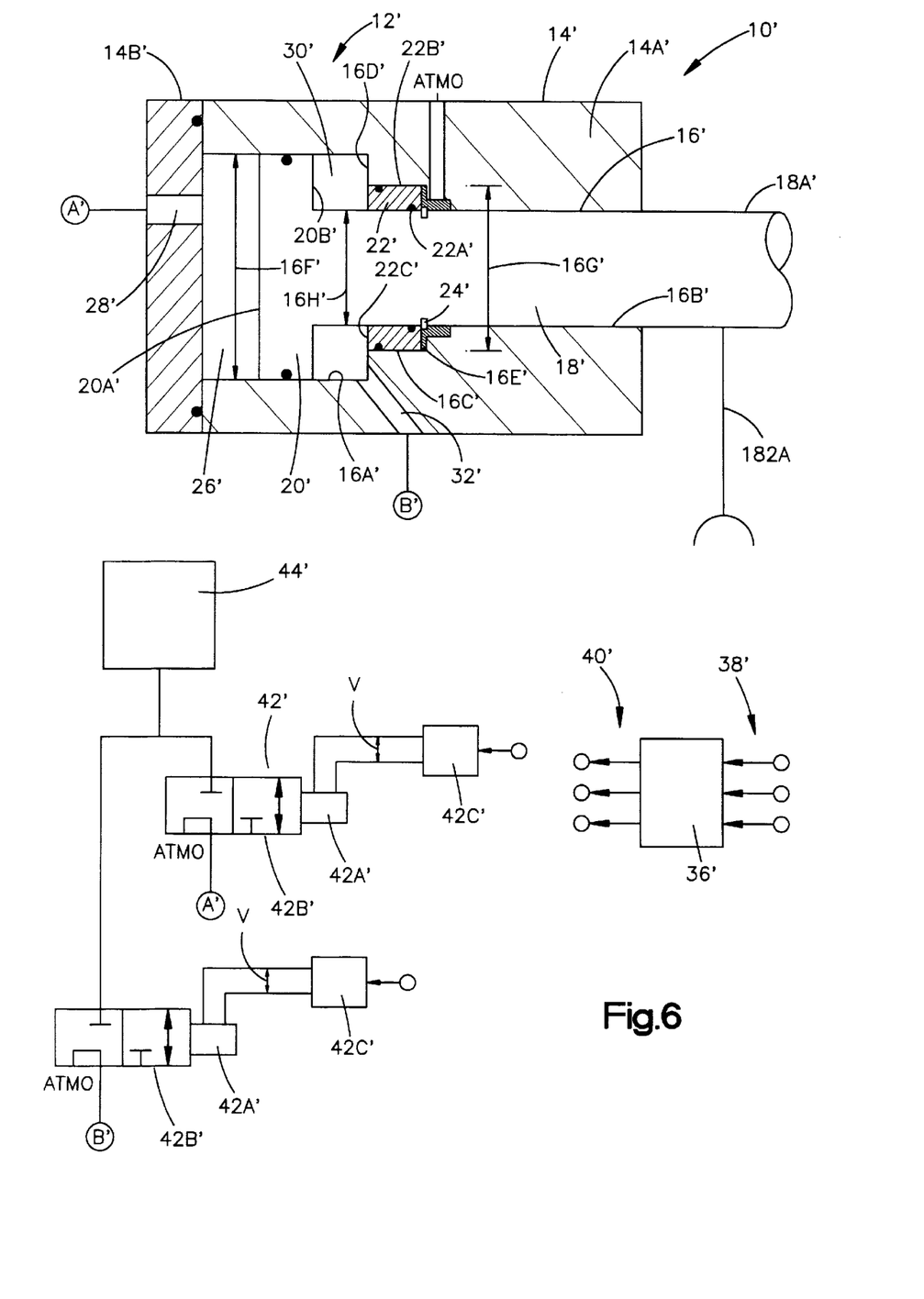
FIG. 6 is a schematic illustration of a fluid-actuated shift actuator system for the range clutch of the transmission.

The shift pattern for shifting transmission 110 is schematically illustrated in FIG. 4. Divisions in the vertical direction at each gear lever position signify splitter shifts, while movement in the horizontal direction from the ¾ and ⅚ leg of the H pattern to the ⅞ and ⁹⁄₁₀ leg of the H pattern signifies a shift from the low range to the high range of the transmission. As discussed above, splitter shifting is accomplished in the usual manner by means of a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 6. Range shift devices of this general type are known in the prior art and may be seen by reference to U.S. Pat. Nos. 3,429,202; 4,455,883; 4,561,325; 4,663,725 and 4,974,468, the disclosures of which are incorporated herein by reference.

Referring again to FIG. 4, and assuming that it is desirable that a transmission have generally equal ratio steps, the mainsection ratio steps should be generally equal, the splitter step should be generally equal to the square root of the mainsection ratio steps, and the range step should equal about the mainsection ratio step raised to the $N^{th}$ power, where N equals the number of mainsection ratio steps occurring in both ranges (i.e., N=2 in the (2+1)×(2×2) transmission 110). Given the desired ideal ratios, gearing to approximate these ratios is selected. In the above example, the splitter steps are about 33.3%, while the range step is about 316%, which generally is suitable for a "2+1" main transmission section having about 78% steps, as the square root of 1.78 equals about 1.33, and 1.78 raised to the second power (i.e., N=2) equals about 3.16.

For certain at least partially automated mechanical transmission systems utilizing mechanical transmissions similar to transmission 110 illustrated in FIGS. 2–4, it may be desirable under certain operating conditions to cause the splitter jaw clutch 180 to move to and remain in the neutral position thereof and/or to vary the force applied to the shift fork 180A and clutch 180. The shift actuator piston assembly 12 and actuator system 10 of the present invention provides a relatively simple, inexpensive and reliable means to provide these desirable splitter clutch control features.

Figure 1:
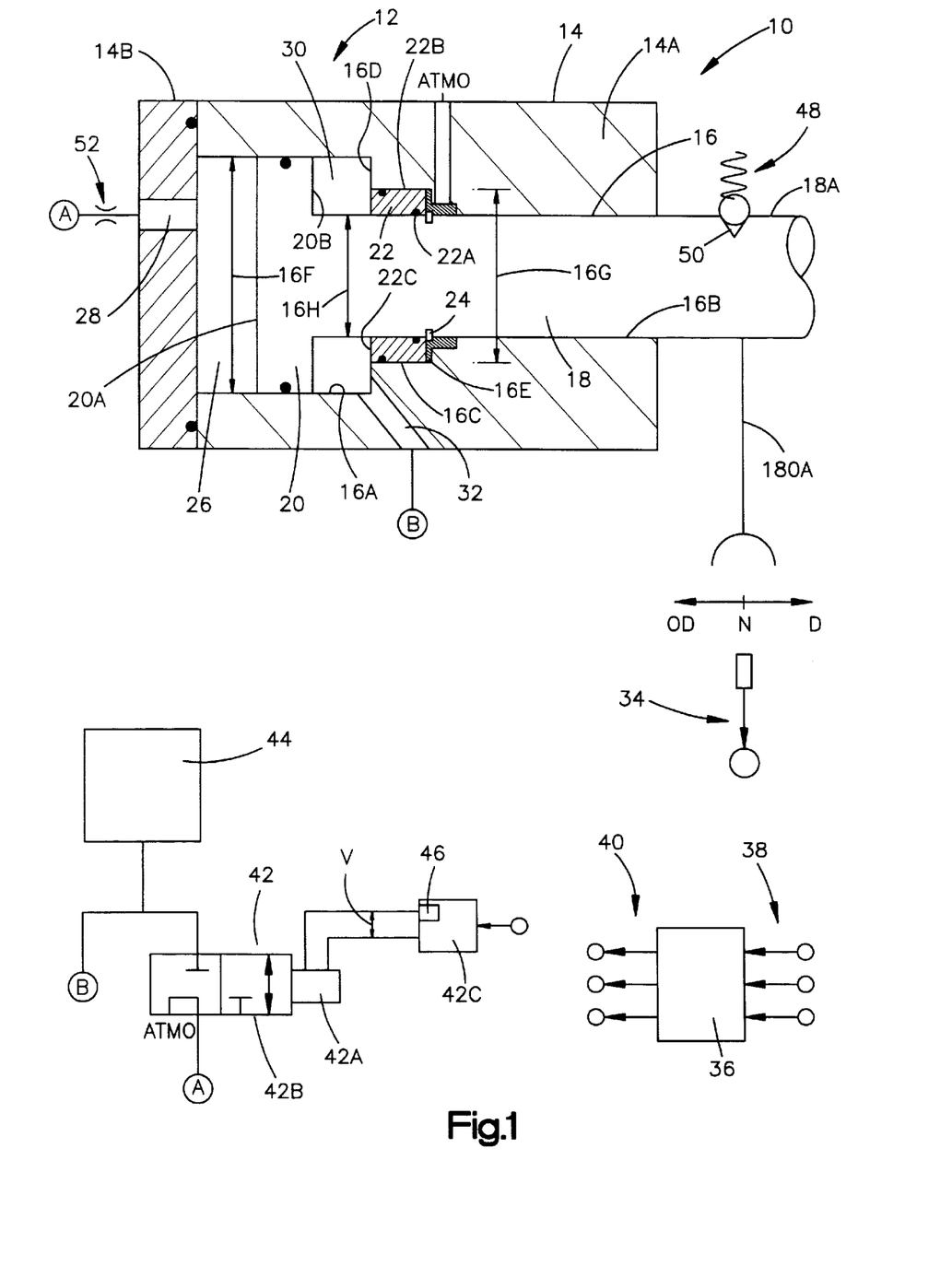
FIG. 1 is a schematic illustration of a fluid-actuated, three-position shift actuator system used in connection with the present invention.

Referring to FIG. 1, the fluid-actuated, three-position actuator piston assembly 12 includes a two-piece cylinder body 14, including a main body piece 14A and an end cap 14B. The cylinder body defines a blind bore 16 from which extends a piston shaft 18 carrying a shift actuator such as the shift fork 180A for axial movement therewith. The blind bore 16 includes an enlarged interior diameter portion 16A, a reduced interior diameter portion 16B, and an intermediate interior diameter portion 16C interposed between the large and small interior diameter portions. Shoulders 16D and 16E, respectively, are defined at the intersections of bore portions 16A and 16C and of bore portions 16C and 16B, respectively. By way of example, for a heavy-duty transmission, the interior diameters 16F, 16G and 16H of bore portions 16A, 16B and 16C, respectively, may be about 2.203 inches, 1.197 inches and 1.850 inches, respectively.

An enlarged differential area piston member 20 is slidably and sealingly received in enlarged bore portion 16A and is fixed to shaft 18 for axial movement therewith. Piston 20 defines a leftward-facing large face 20A and a rightward-facing smaller face 20B.

Shaft 18 is slidably received in smaller diameter bore portion 16B and carries an annular, tubular piston member 22 on the outer diameter surface 18A thereof. Annular, tubular piston member 22 defines an interior diameter surface 22A slidably and sealingly carried by the outer diameter surface 18A of shaft 18 and an outer diameter surface 22B slidably and sealingly received in intermediate diameter portion 16C. The tubular piston also defines a leftward-facing piston face 22C.

Although shaft 18 is illustrated in connection with shift yoke 180A, it also may be utilized to operate other devices such as shift mechanisms of the types illustrated in U.S. Pat. No. 4,920,815, the disclosure of which is incorporated herein by reference.

Rightward axial movement of the annular, tubular piston 22 relative to shaft 18 is limited by stop member 24, while leftward axial movement of the piston 22 relative to shaft 18 is limited by piston face 20B. Rightward axial movement of tubular piston 22 relative to bore 16 and body 14 is limited by shoulder 16E. Piston face 20A and bore portion 16A define a first chamber 26 connected by passage 28 to a selectably pressurized and exhausted fluid conduit A, while piston face 20B, bore portion 16A and the leftward face 22C of tubular secondary piston 22 define a second chamber 30 connected by passage 32 to a constantly pressurized conduit B.

A position sensor 34 may be provided to provide an input signal indicative of the axial position of shaft 18 and/or shift yoke 180A. As is illustrated, shift yoke 180A may be fully leftwardly displaced to engage the overdrive splitter ratio (i.e., gear 174 engaged to mainshaft 146), fully rightwardly displaced to engage the direct drive splitter ratio (i.e., gear 176 engaged to mainshaft 146), or centered in a neutral position area (mainshaft 146 not engaged to either gears 174 or 176).

A microprocessor-based controller (or electronic control unit (ECU)) 36 may be provided to receive various input signals 38 which are processed according to predetermined logic rules to issue command output signals 40 to various system actuators, such as the pulse-width-modulated, solenoid-controlled valve assembly 42 used to control the pressurization and exhaust of conduit A and piston chamber 26. Controllers of this type are known in the prior art, as may be seen by reference to U.S. Pat. Nos. 4,360,060; 4,595,986; 5,281,902 and 5,445,126, the disclosures of which are incorporated herein by reference.

A source of onboard filtered and regulated air 44, usually from the vehicle compressor, is constantly connected directly to chamber 30 through conduit B and passage 32 in body 14. The chamber 26 is selectably connected by conduit A and passage 28 to the source 44 or to atmosphere (ATMO), depending upon the position of the three-way, two-position pulse-width-modulated, solenoid-controlled valve assembly 42. In a typical heavy-duty vehicle, the source of pressurized air 44 will be regulated at about 80 psi.

The microprocessor-based controller 36 may receive input signals from an electronic data link, such as those conforming to industry-established protocols such as SAE J1922, SAE J1939 and/or ISO 11898 and/or from various sensors such as sensors indicative of throttle pedal position, vehicle speed, transmission shaft speed, engine speed, engine torque, shift lever and/or splitter selector manipulation, master clutch condition and the like. The controller 36 also may issue command output signals 40 to display devices, transmission main section and/or range section actuators, engine controllers, master clutch operators, driveline retarder operators and the like. The controller 36 also may issue command output signals to pulse-width-modulated, solenoid-controlled valve assembly 42.

A sensor 158E (FIG. 3) may be provided to provide a signal indicative of the rotational speed of output shaft 158 (also indicative of vehicle speed), and a sensor 60 (FIG. 2) may be provided to provide a signal indicative of operation of the splitter selector switch 62 located on the shift lever 64.

It is important to note that when piston shaft 18/shift yoke 180A (FIG. 1) is in the neutral position and tubular piston 22 is on stop 24 (which is the natural consequence of constantly pressurizing chamber 30), then tubular piston 22 will be in contact with shoulder 16E. Accordingly, if the shaft 18/yoke 180A is displaced in the overdrive (leftward) direction, the face 22C of piston 22 will apply a rightward force on the shaft and yoke (about 130 pounds in the current example), which force will abruptly cease as the shaft 18/yoke 180A moves to neutral or to the direct drive (rightward) direction from neutral. This behavior is utilized to control positioning of the three-position actuator 12, as will be described in greater detail below.

Figure 5:
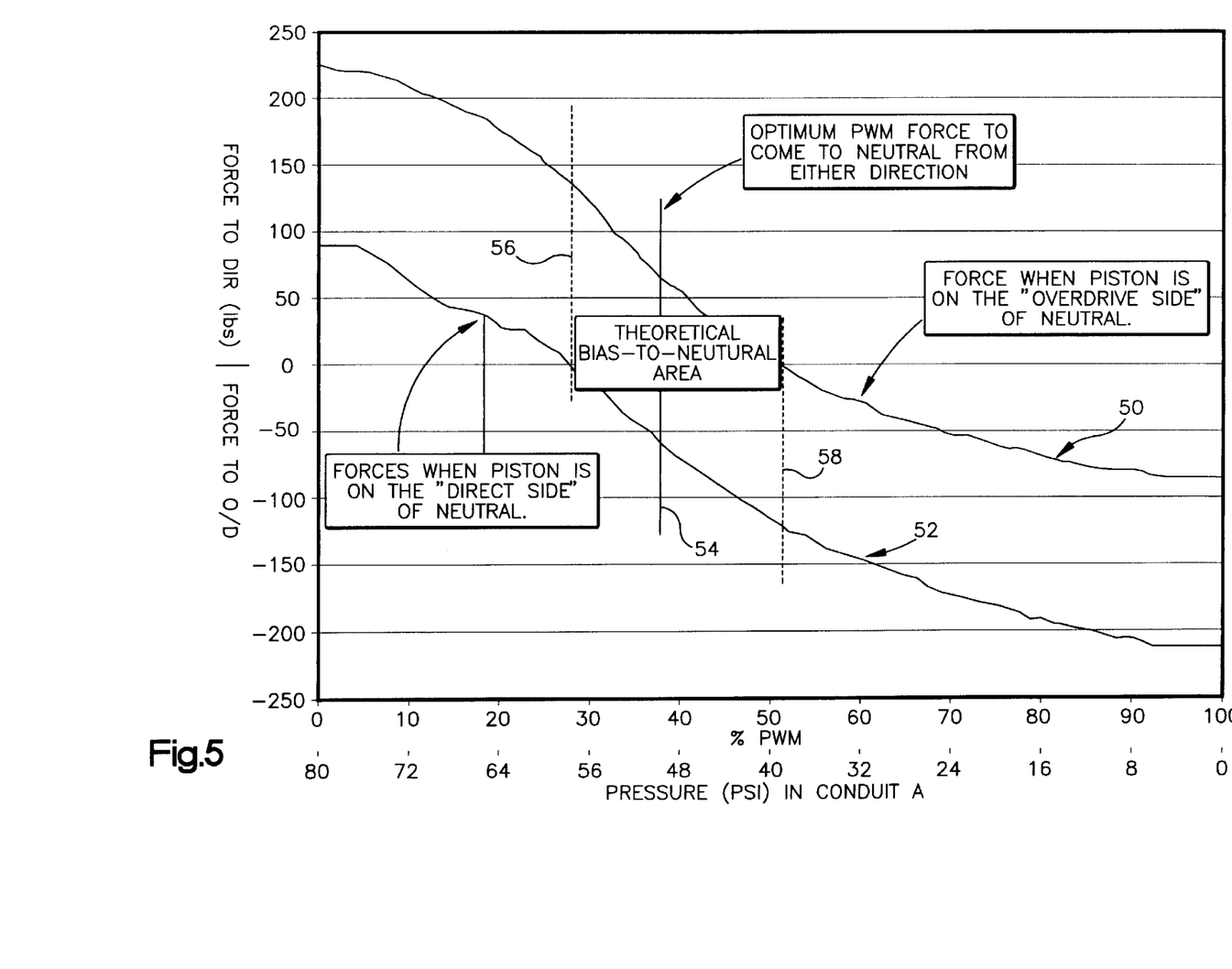
FIG. 5 is a graphic representation of variable force applied by the actuator assembly of the present invention in response to variable pulse width modulation of the single controlled supply valve or variable fluid pressure provided thereby to the first chamber.

FIG. 5 is a graphic representation of the forces applied to the shift yoke 180A at various degrees of pulse width modulation, depending on the positioning of the yoke, and assuming the dimensions set forth above, and an 80-psi source of pressurized fluid (i.e., 20A=2.203 inches; 20B=1.197 inches; 20C=1.850 inches; and source 44=80 psi). In FIG. 5, the percentage of pulse width modulation (% PWM) varies from 0% modulation (fully energized) to 100% modulation (energized none of the time), and positive force is in the direct (rightward) direction, while negative force is in the overdrive (leftward) direction. Line 50 represents the forces applied to the yoke if the yoke is displaced to the overdrive (rightward) direction of neutral, while line 52 represents the forces applied to the yoke if the yoke is displaced to the direct (leftward) direction of neutral. At any given level of pulse width modulation of solenoid-controlled valve 42, or in the corresponding resulting pressurization of conduit A, the difference between lines 50 and 52 is the approximately 130 pounds of force to the right which the tubular piston will provide if the yoke 180A is located to the left (overdrive) side of neutral.

By way of example, if engaged in overdrive, if a 0% modulation (i.e., full energization) of solenoid-controlled valve 42 is commanded, the yoke will be biased from the overdrive position toward neutral with about 220 pounds of force until reaching neutral (line 50) and then will be biased with about 90 pounds of force from neutral to the direct position (line 52). Similarly, at 20% modulation (i.e., valve energized 80% of time), the yoke will be urged toward neutral with about 170 pounds of force and then from neutral into direct with about 40 pounds of force.

As represented by line 54, at about 38% modulation (i.e., valve solenoid energized 62% of time), regardless of the position of the yoke, the yoke will be biased toward neutral with about 65 pounds of force and then abruptly stopped in the neutral position. Theoretically, at about 28% modulation (line 56) to about 52% modulation (line 58), the yoke will be biased to neutral with various amounts of force and will remain in or near the neutral position.

Accordingly, using the three-position actuator system 10 of the present invention, requiring only a single pulse-width-modulation-controlled, solenoid-controlled valve assembly 42, an actuator having three selectable and maintainable positions and selectably variable actuation forces is provided.

In the illustrated system, a modulation of 0% to about 28% will result in the actuator shifting to the direct position, a modulation of about 28% to 52% will result in the actuator shifting to neutral, and a modulation of about 52% to 100% will result in the actuator shifting to the overdrive position. Alternatively, the same results may be obtained by simply providing a variable source of pressure to conduit A by a source selectably variable between 0 psi and 80 psi. The operating characteristics of system 10 may be varied, as required, by varying the relative effective areas of the piston faces 20A, 20B and 22C.

The valve assembly 42 includes a solenoid 42A for controlling the positioning of two-position valve member 42B. A solenoid controller 42C, operated by command signals 40 from ECU 36, is provided to selectively energize and deenergize the coils of the solenoid 42A from an onboard source (not shown) of electrical power, such as a battery or alternator. All or part of controller 42C may be integral with ECU 36. The valve may be of the structure illustrated in aforementioned U.S. Pat. No. 5,661,998.

The voltage V applied to the solenoid valve 42 directly affects the valve response time and, as such, the PWM values that result in a neutral state. This valve response time can vary by more than a factor of 2 over the range of 9 to 18 VDC that a typical onboard system must operate under. System voltage V is sensed by controller 42C and provided to the ECU 36 to adjust the valve PWM value so that the splitter will achieve a neutral state. The control of solenoid 42A, thus, is done as a variable function of sensed voltage V applied to the solenoid. In particular, response times (and, thus, required lead times) are considered to vary inversely with sensed voltage.

The response time of the valve turning off is directly affected by the maximum current in the coil. A circuit 46 is employed in the ECU and/or controller 42C that rolls back the current in the coil of the solenoid valve to a lower and constant value, regardless of the voltage at the coil. By starting from the same point every time, valve off times are very constant and, as such, the variable effects of coil current levels are greatly reduced.

A spring-loaded plunger 48 that fits into a notch 50 in the splitter rod 18 or piston is used to hold the splitter piston 20 in neutral. This spring-loaded plunger or detent increases the range of PWM values that keep the splitter in the neutral state by requiring additional force to move out of this state. The detent is designed such that it gives added force to hold the piston in neutral during PWM conditions but not so much force that it slows the response time for the cylinder as it moves from neutral into gear.

The larger the flow orifice in the valve and/or conduits, the smaller the PWM range that will result in the neutral state for the splitter piston. This is because larger orifices flow so much air that the valve can only be open for a very short time before the pressure in the cylinder rises to a point that the splitter moves through neutral.

Since the same valve 42B used for the splitter piston also may be used for the range piston (one that requires high flow, if required), an orifice or restriction 52 was added between the splitter solenoid valve 42B and the splitter piston chamber 26 to improve this situation. This significantly increases the PWM range to achieve neutral and allows common valves to be used for the splitter and the range pistons.

Solenoid-controlled valve assembly 42 is described above in connection with fluid-actuated, three-position actuator piston assembly 12 for controlling shift fork 180A of splitter clutch 180. A similar valve assembly may be used in connection with a range piston assembly for controlling the shift fork of range clutch 182. A preferred exemplary embodiment of such a valve assembly and range piston assembly is shown in FIG. 6.

FIG. 6 shows a fluid-actuated shift actuator system 10', and an actuator piston assembly 12' utilized therein. The structure of system 10' and assembly 12' are substantially similar to system 10 and assembly 12 described above in connection with FIG. 1. However, piston shaft 18' carries a shift actuator such as shift fork 182A (for axial movement therewith) which axially positions range clutch 182. Also, system 10' does not include a notch or a spring-loaded plunger, such as notch 50 and plunger 48 of FIG. 1. Furthermore, (for high flow purposes) system 10' preferably does not include a restriction such as restriction 52 of FIG. 1.

FIG. 6 also shows a solenoid-controlled valve assembly 42' that is controlled by an ECU 36' which preferably is the same as ECU 36. Valve assembly 42' includes two (2) two-position valve members 42B', with the position of each controlled by a solenoid 42A'. Each solenoid 42A' is selectively energized and de-energized by a solenoid controller 42C', each of which is operated by command signals 40' from ECU 36'. All or part of each solenoid controller 42C' may be integral with ECU 36'. Valve members 42B' are preferably of the same structure as valve member 42B described above in connection with the splitter piston assembly of FIG. 1.

ECU 36' receives various input signals 38' which are processed according to predetermined logic rules to issue command output signals 40' to solenoid-controlled valve assembly 42' for controlling the pressurization and exhaust of both conduit A' (and piston chamber 26') and conduit B' (and piston chamber 30'). In particular, chamber 26' is selectively connected by conduit A' and passage 28' to a source of pressurized air 44' (preferably the same as source 44 of FIG. 1) or to atmosphere (ATMO), depending upon the position of one of the valve members 42B'. Chamber 30' is selectively connected by conduit B' and passage 32' to source 44' or to atmosphere (ATMO), depending upon the position of the other valve member 42B'. In a manner known to one of ordinary skill in the art, such pressurization and exhaust of chamber 26' and chamber 30' controls the movement of piston shaft 18' and shift fork 182A, and thus the position of range clutch 182.

Figure 7:
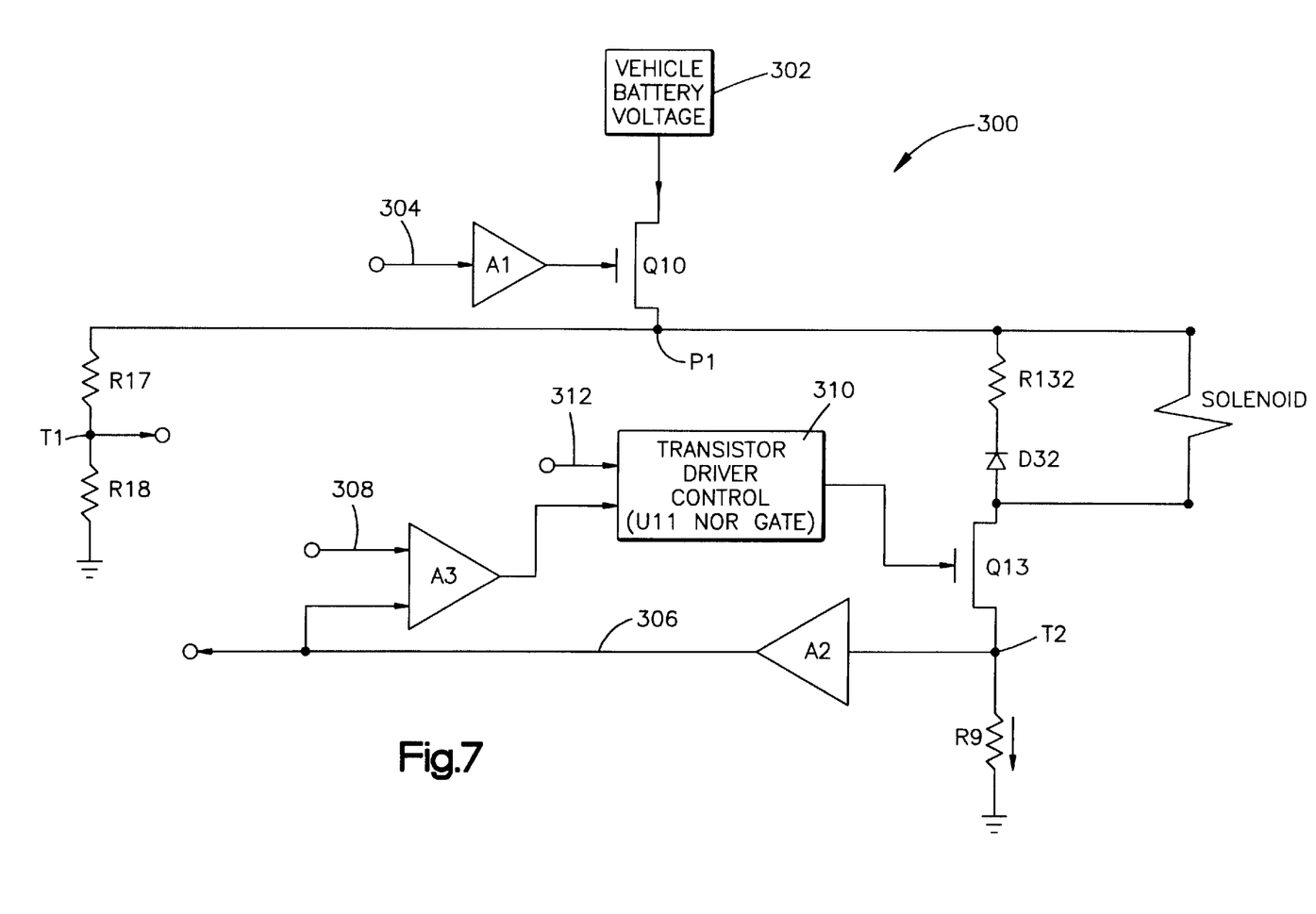
FIG. 7 is a schematic circuit diagram of a solenoid controller of the present invention.

FIG. 7 shows a preferred exemplary embodiment of a solenoid controller circuit 300 which may be characterized as a "low side solenoid driver" circuit. As described below, this circuit is preferably used in solenoid controller 42C of FIG. 1 and solenoid controllers 42C' of FIG. 6. Circuit 300 includes a power supply MOSFET Q10 having its drain connected to a power supply 302 providing, in the preferred embodiment, vehicle battery voltage of typically 12–14 volts. An amplifier A1 receives a power supply control signal from an electronic control unit (preferably serving as both ECU 36 and ECU 36') via connection 304, and passes this signal to the gate of MOSFET Q10. When MOSFET Q10 is driven (ON) by an appropriate voltage signal at its gate, the power supply voltage is supplied to point P1. Point 1 is electrically connected to a voltage divider consisting of resistors R17 and R18, with a test point T1 connected to a digital input of the ECU. The voltage divider functions to convert the supply voltage at point P1 to 0–5 volts at test point T1 so that it may be read as a digital input voltage signal by the ECU. Also electrically connected to point P1 is a solenoid which may be solenoid 42A of FIG. 1 or one of solenoids 42A' of FIG. 6. Connected in parallel with the solenoid is a diode D32 in series with a resistor R132.

Circuit 300 also includes a solenoid driver MOSFET Q13 which, when driven (ON) by an appropriate voltage signal at its gate, energizes the solenoid (assuming supply voltage from power supply 302 is provided to the solenoid) and passes the solenoid current through a resistor R9 to ground. Between MOSFET Q13 and resistor R9 is a test point T2 that is electrically connected to an amplifier A2. When MOSFET Q13 is ON and the solenoid is energized, the voltage that is input to amplifier A2 (the voltage at test point T2 which is the voltage drop across resistor R9) is proportional to the current through the solenoid. After being electronically scaled and filtered by means known to one of ordinary skill in the art, this voltage signal is supplied via connection 306 to the analog input of the ECU, for reasons discussed below. Connection 306 also feeds back this voltage signal (indicative of solenoid current) to a solenoid current control amplifier A3 which combines it with a solenoid current level request signal received from the ECU via connection 308 (that is appropriately scaled to an analog voltage signal). The output voltage signal of amplifier A3 is supplied to the input of a control circuit 310 which also receives a solenoid driver ON/OFF request signal from the ECU via connection 312. Control circuit 310 determines whether or not MOSFET Q13 is driven, and thus whether or not the solenoid is energized (assuming supply voltage from power supply 302 is provided to the solenoid). The voltage signal from amplifier A3 functions as a PWM (pulse width modulation) control which may be used by circuit 310 to control the level of solenoid current.

In the preferred embodiment, control circuit 310 is a NOR gate. Also, in the preferred embodiment, resistor R17 is a 3920 ohm resistor, resistor R18 is a 5111 ohm resistor, resistor R132 is a 3 ohm resistor, and resistor R9 is a 0.1 ohm resistor.

In the preferred embodiment described below, solenoid controller circuit 300 is implemented within solenoid controller 42C of FIG. 1 (used in connection with the control of solenoid 42A, valve 42B, and ultimately splitter clutch 180) and within the two solenoid controllers 42C' of FIG. 6 (used in connection with the control of solenoids 42A', valves 42B', and ultimately range clutch 182). A common power supply 302, MOSFET Q10, and amplifier A1 are preferably used in all three solenoid controller circuits 300 so implemented, such that one transistor controls the supply of power to all three solenoids (solenoid 42A and the two solenoids 42A'). However, in other embodiments, each solenoid controller circuit 300 may be completely separate, including a separate power supply 302 for each. Such alternative embodiments are less preferred due to higher cost considerations associated with more than one such power supply 302. In addition to the common components mentioned above, a common voltage divider (consisting of resistors R17 and R18 with test point T1 therebetween) is preferably used in all three circuits 300.

Figure 8:
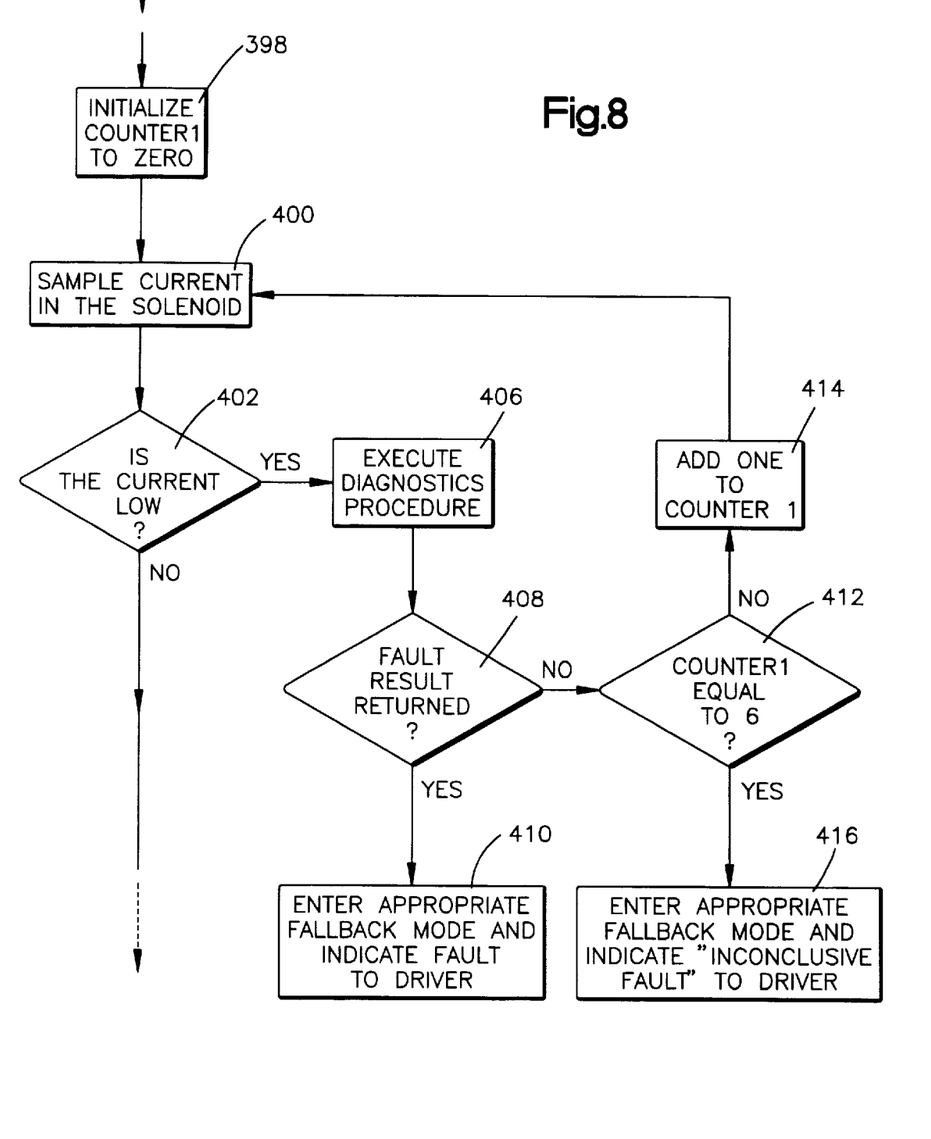
FIGS. 8 and 9 are flowcharts of the programming of the electronic control unit implementing the fault detection logic of the present invention.
Figure 9:
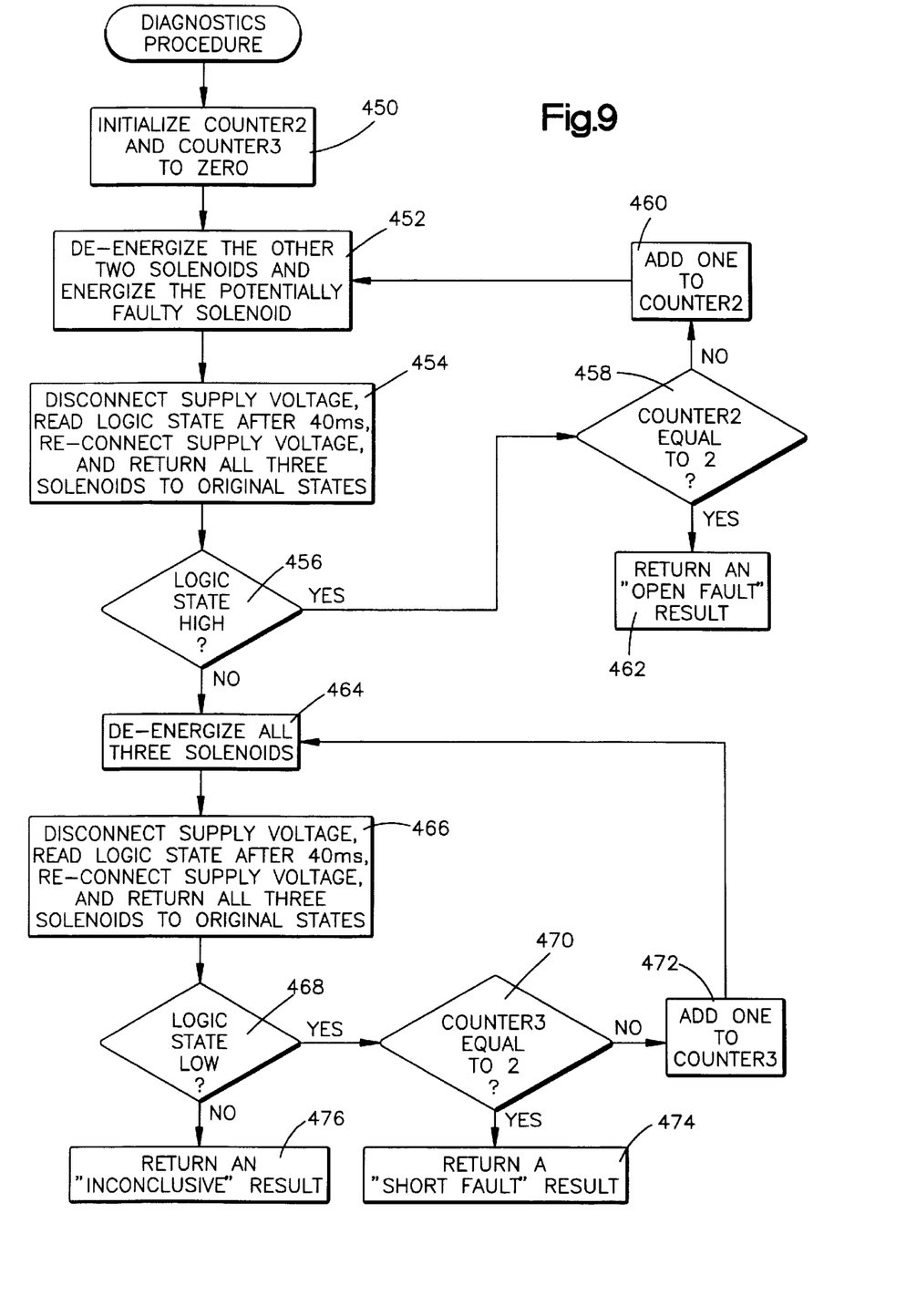

The ECU is programmed with fault detection logic of the present invention which is implemented in connection with solenoid controller circuits 300 for detecting faults in solenoid 42A or in solenoids 42A'. Shown in FIGS. 8 and 9 are preferred exemplary flowcharts of the programming of the ECU wherein the fault detection logic is implemented. For the sake of simplicity, the flowcharts are directed to the detection of faults within only one of the three solenoids. Of course, in the preferred embodiment, the fault detection logic is likewise applied to the other two solenoids.

Referring first to FIG. 8, the fault detection logic begins with block 398 which is executed during normal operation of the ECU programming. In block 398, the program causes a counter, "counter1", to be initialized to zero in preparation for its use in subsequent programming. The program then proceeds to block 400 wherein the current in the solenoid is periodically sampled by the ECU via connection 306 of its solenoid controller circuit 300 (as described above in connection with FIG. 7). If the solenoid that is being checked for faults is not initially energized (when the fault detection logic is executed), block 400 causes the ECU to briefly energize the solenoid (provide an appropriate drive signal to the gate of MOSFET Q13) so that the current flows and a voltage signal indicative of current is supplied to the ECU via connection 306. As known to one of ordinary skill in the art, the duration of such energization is kept to a minimum so that the valve associated with the solenoid is not inadvertently actuated.

The program then proceeds to block 402 which determines whether or not the sampled solenoid current is abnormally "low" (below a predetermined current value) for more than a predetermined period of time. In the preferred embodiment, the predetermined current value (against which solenoid current is compared) is a value representing approximately half of the current that is normally expected in the solenoid when in its then-current operating condition. For example, in one embodiment, normal solenoid current (for an initially active solenoid) is in the range of 1–1.3 amps, and the predetermined current value (against which actual current value is compared) is appropriately 500 millliamps. The predetermined period of time will depend on whether the solenoid was initially energized or if it had to be briefly energized in order to sample the current (as described above). If the solenoid was initially energized, the predetermined time period preferably is approximately 100 milliseconds. If the solenoid was not initially energized, the predetermined time period preferably is approximately 300 milliseconds.

If block 402 determines that the sampled solenoid current is not below the predetermined current value for more than the predetermined period of time ("NO"), then the possibility of a solenoid fault is not indicated (or likely), and the program proceeds to other portions of the ECU programming.

If, however, block 402 determines that the sampled solenoid current is below the predetermined current value for more than the predetermined time period ("YES"), then a possibility exists that the solenoid has a fault. Faults possibly indicated include (1) an opened solenoid coil winding, (2) a shorted solenoid coil winding, (3) the low side power leads of the solenoid shorted to ground, and (4) opened solenoid power leads. The program then proceeds to block 406 which causes the DIAGNOSTICS PROCEDURE shown in FIG. 9 to be executed. The DIAGNOSTICS PROCEDURE, described in greater detail below, returns with an "inconclusive" result, an "open fault" result (corresponding to either fault (1) or (4) listed above), or a "shorted fault" result (corresponding to either fault (2) or (3) listed above). The program then proceeds to block 408 which determines whether or not a fault result ("open" or "shorted") has been returned. If so ("YES"), the program proceeds to block 410 which causes the ECU to operate the transmission in an appropriate "fallback" mode of operation which is designed to prevent damage to the transmission, or undesirable transmission operation, despite the existence of the solenoid fault. The manner of selection of an appropriate fallback mode depends, at least in part, upon whether the fault result is an "open fault" or a "shorted fault" result, as well as the state of the transmission when the fault is detected. Block 410 preferably also causes the ECU to indicate the detected fault to the operator of the vehicle. Preferably, a warning lamp on the operator's shift knob is employed for this purpose, and preferably identifies the faulty solenoid by implementing a specific blink rate for that particular solenoid (blink codes).

If, however, block 408 determines that a fault result ("open" or "shorted") has not been returned ("NO"), then an "inconclusive" result must have been returned and the program proceeds to block 412. An "inconclusive" result occurs when solenoid current abnormally dropped but the DIAGNOSTICS PROCEDURE is unable to detect a solenoid fault. Such an "inconclusive" result can be caused by a variety of things, most notably when an EMI (electromagnetic interference) event is experienced by the vehicle. An EMI event can drive LOW the analog input lines to the ECU, resulting in an erroneously "low" reading of solenoid current that triggers the solenoid fault DIAGNOSTICS PROCEDURE. Because an EMI event is normally of short duration, a vehicle may be able to "ride through" such an event until the ECU's analog input lines return to normal and sampled current readings are once again accurate. Block 412 facilitates such a "ride through" attempt. Block 412 determines whether or not counter "counter1" is equal to 6. If not ("NO"), then the program proceeds to block 414 which adds one to the counter, and the program loops back to block 400 to sample the solenoid current again, thereby beginning another fault detection logic cycle. By means of blocks 412 and 414, the program repeats the fault detection logic cycle seven times (in the preferred embodiment), thereby trying to wait out an EMI event (or other cause of an "inconclusive" result). If, during one of these seven cycles, the cause of the "inconclusive" result terminates and the sampled current returns to normal levels, then block 402 will cause the program to exit the fault detection logic and proceed to other portions of the ECU's programming. If, however, throughout the seven cycle time period, block 402 continually determines than an abnormally low current is present and "inconclusive" results are continually returned from the DIAGNOSTICS PROCEDURE, then block 412 will eventually determine that counter1 counted to 6 ("YES"), and the program proceeds to block 416. Block 416 then causes the ECU to operate the transmission in an appropriate fallback mode, and to indicate the detected "inconclusive fault" to the operator of the vehicle (preferably in the manner described above in connection with block 410). In this situation, a problem exists with the solenoid, but it is a problem which the DIAGNOSTICS PROCEDURE was unable to identify.

Referring now to FIG. 9, shown is the DIAGNOSTICS PROCEDURE that is executed by block 406 of FIG. 8. The procedure begins with block 450 that causes two counters, "counter2" and "counter3", to be initialized to zero in preparation for their use in subsequent programming. Next, block 452 begins an "open circuit solenoid test", the purpose of which is to detect the possible existence of an "open fault" such as an opened solenoid coil winding or opened solenoid power leads. In the preferred embodiment, block 452 causes the other two solenoids (those which are not the present subject of the fault detection logic) to be (or remain)

de-energized. The purpose of this de-energization is to isolate the potentially faulty solenoid (all three solenoids share a common power supply 302 in the preferred embodiment) so that the "decay test" described below is only affected by the potentially faulty solenoid. De-energization is achieved via appropriate control signals from the ECU to control circuit 310 of each solenoid's solenoid controller circuit 300, whereby each solenoid's solenoid driver MOSFET Q13 is turned OFF. Block 452 also causes the potentially faulty solenoid to be (or remain) energized by an appropriate drive signal to the gate of its driver MOSFET Q13.

The program then proceeds to block 454 which causes the ECU to turn OFF power supply MOSFET Q10 so that power supply voltage is no longer supplied to point P1 of circuit 300 (FIG. 7). At this time, a "decay test" begins whereby the voltage at point P1 begins to decay at a certain rate. As the voltage decays, the voltage divider of circuit 300 converts the decayed voltage to 0–5 volts at test point T1. After a predetermined time period (approximately 40 milliseconds in the preferred embodiment), block 454 causes the ECU to read the voltage at test point T1 as a digital input voltage. If the voltage at point P1 has decayed (during the 40 millisecond time period) to such an extent that the converted voltage at test point T1 drops below approximately 0.8 volts (in the preferred embodiment), then the ECU will digitally read the T1 voltage value as a LOW logic state. On the other hand, the ECU will digitally read the T1 voltage value as a HIGH logic state if the T1 voltage is 0.8 volts or higher. (In the preferred embodiment using the circuit 300 component values set forth above, a voltage of 0.8 volts at test point T1 corresponds to a voltage of 1.4 volts at point P1.) After the logic state of test point T1 has been read by the ECU, block 454 then causes the ECU to turn ON power supply MOSFET Q10 so that power supply voltage is again supplied to point P1 of circuit 300, and causes all three solenoids to return to their original energized or de-energized states. This reconnection of the power supply voltage and return of the solenoids to their original states must be performed within a particular time period in order to prevent undesired valve changes that could affect transmission operation. A time period of approximately 90 milliseconds was experimentally determined to be an appropriate time period within which to have block 454 perform the described restorations.

After block 454, then program proceeds to block 456 which determines whether or not the logic state read by the ECU at test point T1 is HIGH. If so ("YES"), then the solenoid is assumed to have an "open fault", and the program proceeds to block 458. The reason for this assumption is that an energized solenoid, without an "open fault", would cause a fast discharge of energy whereby the logic state at test point T1 would be read as LOW. The fact that such a fast discharge did not take place is strongly indicative of the existence of an "open fault". However, before the assumption of an "open fault" is accepted as a fact, it is desirable, in the preferred embodiment, to repeat the "open circuit solenoid test" in order to confirm the results. Block 458 facilitates such a confirmation. Block 458 determines whether or not counter "counter2" is equal to 2. If not ("NO"), then the program proceeds to block 460 which adds one to the counter, and the program loops back to block 452 to begin another "open circuit solenoid test". By means of blocks 458 and 460, the program repeats the test three times (in the preferred embodiment). If, during one of these three test cycles, the logic state at test point T1 is read as LOW, then confirmation is not achieved, and block 456 will cause the test to be exited. If, however, block 456 determines that the logic state is HIGH for three consecutive test cycles, then confirmation is achieved, and block 458 will eventually determine that counter2 counted to 2 ("YES"). The program then proceeds to block 462 which causes the DIAGNOSTICS PROCEDURE to return an "open fault" result to block 406 of FIG. 8.

In the preferred embodiment, the assumption of an "open fault" can be confirmed in another way when the possibly faulty solenoid is solenoid 42A of FIG. 1 (which is used in the actuation of splitter piston assembly 12), and the possibly faulty solenoid was originally energized (when fault detection logic was initiated). In these circumstances, if splitter shift fork 180A slips into neutral, then a high probability exists that an "open fault" is present. Therefore, detection by the ECU of such slippage (when the proper circumstances exist) can serve as confirmation of an "open fault", and is included in the logic of block 458 (or elsewhere) in the preferred embodiment. Because the aforementioned slippage is highly undesirable, inclusion of such logic is especially preferable since it speeds up the identification of the fault in those circumstances.

Returning now to block 456, if it determines that the logic state read by the ECU at test point T1 is not HIGH ("NO"), then the program proceeds to block 464. Block 464 begins a "short solenoid test", the purpose of which is to detect the possible existence of a "shorted fault" such as a shorted solenoid coil winding or when the low side power leads of the solenoid are shorted to ground. Similar to block 452, block 464, in the preferred embodiment, causes the other two solenoids (those which are not the present subject of the fault detection logic) to be (or remain) de-energized, for the purpose described above. Block 464, however, also causes the potentially faulty solenoid to be (or remain) de-energized by turning OFF its driver MOSFET Q13.

The program then proceeds to block 466 which performs the same operations as block 454, described above. After block 466, the program proceeds to block 468 which determines whether or not the logic state read by the ECU at test point T1 is LOW. If so ("YES"), then the solenoid is assumed to have a "shorted fault", and the program proceeds to block 470. The reason for this assumption is that a de-energized solenoid, without a "shorted fault", would result in a slow discharge of energy (during the "decay test") whereby the logic state at test point T1 would be read as HIGH. The fact that a fast discharge instead took place is strongly indicative of the existence of a "shorted fault". However, before the assumption of a "shorted fault" is accepted as a fact, it is desirable, in the preferred embodiment, to repeat the "short solenoid test" to confirm the results. In the manner similar to that described above in connection with blocks 458 and 460, blocks 470 and 472 facilitate such a confirmation by repeating the test three times (in the preferred embodiment). If, during one of these three test cycles, the logic state at test point T1 is read as HIGH, then confirmation is not achieved, and block 468 will cause the test to be exited. If, however, block 468 determines that the logic state is LOW for three consecutive test cycles, then confirmation is achieved, and block 470 will eventually determine that counter 3 counted to 2 ("YES"). The program then proceeds to block 474 which causes the DIAGNOSTICS PROCEDURE to return a "short fault" result to block 406 of FIG. 8.

In the preferred embodiment, the assumption of a "short fault" can be confirmed in another way when the possibly faulty solenoid is solenoid 42A (used in the actuation of splitter piston assembly 12), and the possibly faulty solenoid was originally de-energized (when fault detection logic was initiated). In these circumstances, if splitter shift fork 180A slips into neutral, a high probability exists that a "short fault" is present. Therefore, detection by the ECU of such slippage (when the proper circumstances exist) can serve as confirmation of a "short fault", and is preferably included in the logic of block 470 (or elsewhere) whereby it advantageously speeds up the identification of the fault in those circumstances.

Returning now to block 468, if it determines that the logic state read by the ECU at test point T1 is not LOW ("NO"), then the program proceeds to block 476. Block 476 causes the DIAGNOSTICS PROCEDURE to return an "inconclusive" result to block 406 of FIG. 8.

Although the preferred embodiment of the present invention is described above in connection with a low side solenoid driver circuit, the fault detection logic of the present invention may, of course, be implemented with other appropriate circuit configurations. Furthermore, the present invention may be implemented for the detection of faults in solenoids used in any portion of a transmission as well as in other non-transmission related systems.

Although the preferred embodiment of the present invention has been described with a certain degree of particularity, various changes to form and detail may be made without departing from the spirit and scope of the invention as hereinafter claimed.

We claim:

1. A system for sensing faults in a solenoid-controlled actuator assembly, said system comprising:
   a solenoid;
   a power supply providing supply voltage;
   a solenoid driver circuit for selectively energizing and de-energizing said solenoid;
   a current sense circuit for sensing the current in said solenoid and generating a solenoid current signal;
   a power supply switching circuit for selectively connecting and disconnecting said supply voltage from said solenoid;
   a voltage decay detection circuit coupled to said solenoid for generating a voltage signal; and
   a processing circuit coupled to said solenoid driver circuit, said current sense circuit, said power supply switching circuit, and said voltage decay detection circuit, said processing circuit implementing fault detection logic wherein said processing circuit receives said solenoid current signal and, if said solenoid current signal is below a predetermined current value for a predetermined time period, causes said solenoid driver circuit to energize said solenoid, causes said power supply switching circuit to disconnect said supply voltage from said solenoid, and monitors the rate of voltage decay in said voltage signal to determine if a fault exists.

2. The system as defined in claim 1 wherein said processing circuit monitors the rate of voltage decay in said voltage signal by determining if said voltage signal remains above a predetermined voltage level for a second predetermined time period in order to determine if an open circuit fault exists.

3. The system as defined in claim 2 wherein the actuator assembly is implemented in a vehicular transmission system including a multi-position shift fork having a neutral position.

4. The system as defined in claim 3 wherein said fault detection logic determines if said solenoid was already energized and if said shift fork is in said neutral position.

5. The system as defined in claim 1 wherein the actuator assembly is implemented in a vehicular transmission system.

6. The system as defined in claim 1 wherein said voltage decay detection circuit includes a voltage divider.

7. The system as defined in claim 1 wherein said solenoid driver circuit and said power supply switching circuit each includes a MOSFET.

8. The system as defined in claim 1 wherein current sense circuit includes a resistor connected between said solenoid and ground.

9. The system as defined in claim 1 wherein said processing circuit is a microprocessor-based controller.

10. A system for sensing faults in a solenoid-controlled actuator assembly, said system comprising:
    a solenoid;
    a power supply providing supply voltage;
    a solenoid driver circuit for selectively energizing and de-energizing said solenoid;
    a current sense circuit for sensing the current in said solenoid and generating a solenoid current signal;
    a power supply switching circuit for selectively connecting and disconnecting said supply voltage from said solenoid;
    a voltage decay detection circuit coupled to said solenoid for generating a voltage signal; and
    a processing circuit coupled to said solenoid driver circuit, said current sense circuit, said power supply switching circuit, and said voltage decay detection circuit, said processing circuit implementing fault detection logic wherein said processing circuit receives said solenoid current signal and, if said solenoid current signal is below a predetermined current value for a predetermined time period, causes said solenoid driver circuit to de-energize said solenoid, causes said power supply switching circuit to disconnect said supply voltage from said solenoid, and monitors the rate of voltage decay in said voltage signal to determine if a fault exists.

11. The system as defined in claim 10 wherein said processing circuit monitors the rate of voltage decay in said voltage signal by determining if said voltage signal is below a predetermined voltage level after a second predetermined time period in order to determine if a short circuit fault exists.

12. The system as defined in claim 11 wherein the actuator assembly is implemented in a vehicular transmission system including a multi-position shift fork having a neutral position.

13. The system as defined in claim 12 wherein said fault detection logic determines if said solenoid was already de-energized and if said shift fork is in said neutral position.

14. The system as defined in claim 10 wherein the actuator assembly is implemented in a vehicular transmission system.

15. The system as defined in claim 10 wherein said voltage decay detection circuit includes a voltage divider.

16. The system as defined in claim 10 wherein said solenoid driver circuit and said power supply switching circuit each includes a MOSFET.

17. The system as defined in claim 10 wherein current sense circuit includes a resistor connected between said solenoid and ground.

18. The system as defined in claim 10 wherein said processing circuit is a microprocessor-based controller.

* * * * *